(12) United States Patent
Chang (10) Patent No.: US 8,392,144 B2
(45) Date of Patent: Mar. 5, 2013

(54) KEYBOARD TEST PROGRAM GENERATING METHOD

(75) Inventor: Pei-Ming Chang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 325 days.

(21) Appl. No.: 12/788,093

(22) Filed: May 26, 2010

(65) Prior Publication Data

US 2011/0251818 A1    Oct. 13, 2011

(30) Foreign Application Priority Data

Apr. 9, 2010   (TW) ............................... 99111062 A (51) Int. Cl.
  *G01R 31/00*    (2006.01)
  *G06F 19/00*    (2011.01)
(52) U.S. Cl. ............ 702/120; 73/865.3; 714/27; 714/44
(58) Field of Classification Search ............... 702/35, 702/108, 120, 121, 122, 184; 73/865.3; 194/200; 341/22; 714/27, 43, 44
See application file for complete search history.

(56) References Cited

U.S. PATENT DOCUMENTS

| | | | | |
|---|---|---|---|---|
| 5,501,518 A | * | 3/1996 | Woodward | 702/120 |
| 5,827,983 A | * | 10/1998 | Ortoli | 73/865.3 |
| 5,875,293 A | * | 2/1999 | Bell et al. | 714/27 |
| 6,330,514 B1 | * | 12/2001 | Kuo | 702/35 |
| 8,117,504 B2 | * | 2/2012 | Chang | 714/44 |

* cited by examiner

*Primary Examiner* — John H Le
(74) *Attorney, Agent, or Firm* — Tracy M. Heims; Apex Juris, pllc (57) ABSTRACT

A keyboard test program generating method includes the following steps. Firstly, a first key number is received. By pressing a first key, a first key identification code corresponding to the first key is generated. The first key number is assigned to the first key so as to generate a first key conditional expression. By pressing a next key, a next key identification code corresponding to the next key is generated. A second key number following the first key number is assigned to the next key so as to generate a next key conditional expression. Afterwards, these key conditional expressions, a keyboard test program header and a keyboard test program trailer are combined together, thereby generating the keyboard test program.

10 Claims, 9 Drawing Sheets

KEYBOARD TEST PROGRAM GENERATING METHOD

FIELD OF THE INVENTION

The present invention relates to a program generating method, and more particularly to a keyboard test program generating method.

BACKGROUND OF THE INVENTION

With rapid development of electronic and information industries, computers and the peripheral devices thereof become essential parts in our daily lives. In addition to the working purposes, computers and the peripheral devices thereof can be employed as amusement tools. In a computer system, an input device plays important roles for communicating the computer with the user. The common input device of the computer system includes for example a mouse, a keyboard, a trackball, and the like. Among these input devices, the keyboard device is the most important. Via plural keys of the keyboard device, corresponding instructions may be inputted to the computer.

Figure 1:
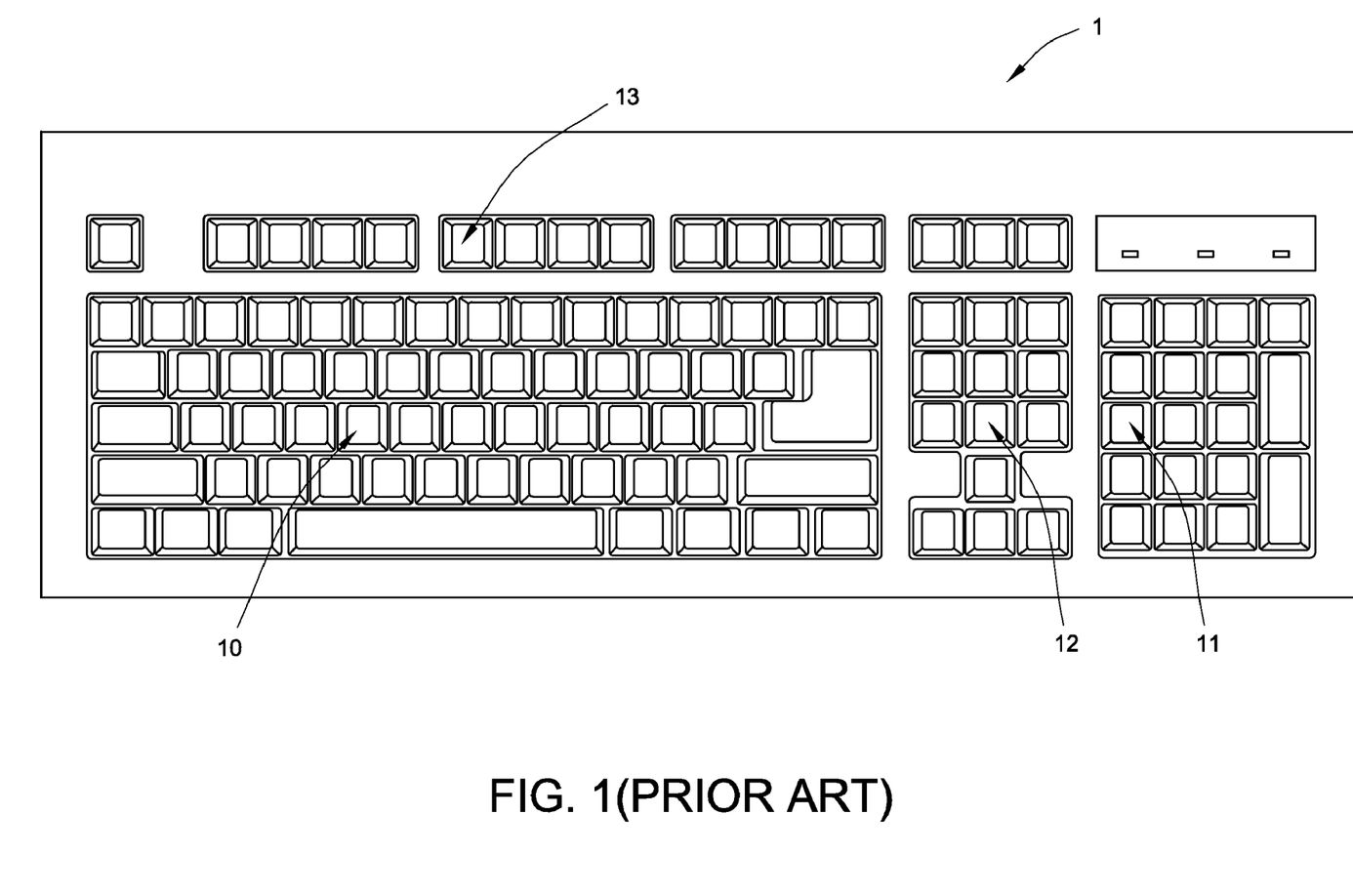
FIG. 1 is a schematic view illustrating the outward appearance of a conventional keyboard device.

FIG. 1 is a schematic view illustrating the outward appearance of a conventional keyboard device. There are plural keys mounted on the surface of the conventional keyboard device 1. These keys are classified into ordinary keys 10, numeric keys 11, extension keys 12 and hot keys 13. When one or more keys are pressed, a corresponding signal is issued to the computer and thus the computer executes a function corresponding to the pressed keys. For example, when the ordinary keys 10 are pressed, corresponding symbols (e.g. English letters) are inputted into the computer. When the extension key 12 is pressed, a specified function (e.g. a Page Up function or a Page Down function) is executed. In addition, by pressing the hot key 13, an application program is executed to perform an additional specific function (e.g. starting or stopping playback of a multimedia file). Moreover, the conventional keyboard device 1 further comprises other keys such as Print screen, Caps lock, Number lock and Scroll lock.

As known, in the fabricating process of the keyboard device, a testing process is performed to assure normal functions of the keyboard device. The testing process includes a procedure of testing the circuit board of the keyboard device and a procedure of testing the overall functions of the assembled keyboard device. By testing the circuit board, the manufacturer could realize whether any defects are present in the circuit board or not. If the procedure of testing the circuit board is omitted but some defects are found, the keyboard device needs to be disassembled to debug the circuit board after the keyboard device is assembled. It is troublesome and time-consuming to dissemble the keyboard device and debug the circuit board. The subject matter of the present invention is aimed at the procedure of testing the overall functions of the assembled keyboard device.

Generally, for testing the keyboard device 1, a keyboard test program specially for testing the keyboard device 1 should be previously written. Under execution of the keyboard test program, the tester may successively press all keys of the keyboard device 1 to judge whether the functions of the tested keys of the keyboard device 1 are normal. The key conditional expressions of the keyboard test program are used for testing a keyboard device having a certain key arrangement. That is, if the key arrangement is changed, a different keyboard test program should be employed to test the keyboard device. For complying with diversified requirements, the keyboard manufactures may usually produce various keyboard devices with different key arrangements. For example, the keyboard device may have several additional hot keys with different functions (e.g. volume control of multimedia files) or Korean keys specially designed for Korean users. In other words, for testing a keyboard device with a different key arrangement, a new keyboard test program should be rewritten or the current keyboard test program should be modified to a new keyboard test program. Since the program writing process is both troublesome and time-consuming, there is a need of providing a time-saving keyboard test program generating method.

SUMMARY OF THE INVENTION

An object of the present invention provides a keyboard test program generating method capable of automatically generating a keyboard test program without manually writing.

In accordance with an aspect of the present invention, there is provided a keyboard test program generating method for generating a keyboard test program to test plural keys of a keyboard device. The plural keys include a first key and a second key. The keyboard test program generating method includes the following steps. Firstly, a first key number is received. Then, a first key identification code corresponding to the first key is received. The first key number is assigned to the first key, so that the first key number and the first key identification code are written into a conditional expression format to generate a first key conditional expression. Then, a second key identification code corresponding to the second key is received. A second key number following the first key number is assigned to the second key, so that the second key number and the second key identification code are written into the conditional expression format to generate a second key conditional expression. Afterwards, the first key conditional expression, the second key conditional expression, a keyboard test program header and a keyboard test program trailer are combined together, thereby generating the keyboard test program.

In an embodiment, the keyboard test program header and the keyboard test program trailer are previously written and stored. In addition, the keyboard test program header and the keyboard test program trailer are generated by clicking a keyboard test program header selective item and a keyboard test program trailer selective item of a test program generating interface, respectively.

In an embodiment, the keyboard test program generating method further includes steps of opening a current keyboard test program including plural current key conditional expressions, the keyboard test program header and the keyboard test program trailer, and adding the first key conditional expression and the second key conditional expression to the plural current key conditional expressions to result in updated plural key conditional expressions, so that the updated plural key conditional expressions, the keyboard test program header and the keyboard test program trailer are combined together to generate the keyboard test program.

In an embodiment, the sequences of testing the plural keys of the keyboard device are determined according to the first key number and the second key number in ascending order.

In an embodiment, the first key identification code is generated when the first key is pressed, and the second key identification code is generated when the second key is pressed.

In an embodiment, the first key identification code and the second key identification code are scan codes.

In an embodiment, the first key conditional expression, the second key conditional expression, the keyboard test program header and the keyboard test program trailer are saved as a Notepad file or a Microsoft Word document file.

In an embodiment, a document filename of the Notepad file or the Microsoft Word document file is inputted via a save filename field of a test program generating interface.

In an embodiment, when the keyboard test program is executed, the keyboard test program provides a keyboard test interface to prompt which keys of the plural keys have been tested and which key needs to be pressed and continuously tested.

In an embodiment, the keyboard test interface includes plural key images, which are classified into an untested key image, a to-be-tested key image and a tested key image. The untested key image is marked with a first color, the to-be-tested key image is marked with a second color, and the tested key image is marked with a third color.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides a keyboard test program generating method for automatically generating a keyboard test program without the need of writing the program. The definition of the keyboard test program in this context will be illustrated as follows. In accordance with the present invention, the keyboard test program includes a keyboard test program header, a keyboard test program trailer and plural key conditional expressions corresponding to plural keys. The keyboard test program header is used for declaring all of the parameters that are employed in the plural key conditional expressions. The plural key conditional expressions are used for testing the plural keys of the keyboard device. The keyboard test program trailer is used as the end of the overall keyboard test program in order to enable the keyboard test program. Generally, the contents of the keyboard test program header and the keyboard test program trailer are constant, and could be previously written and stored.

Figure 2:
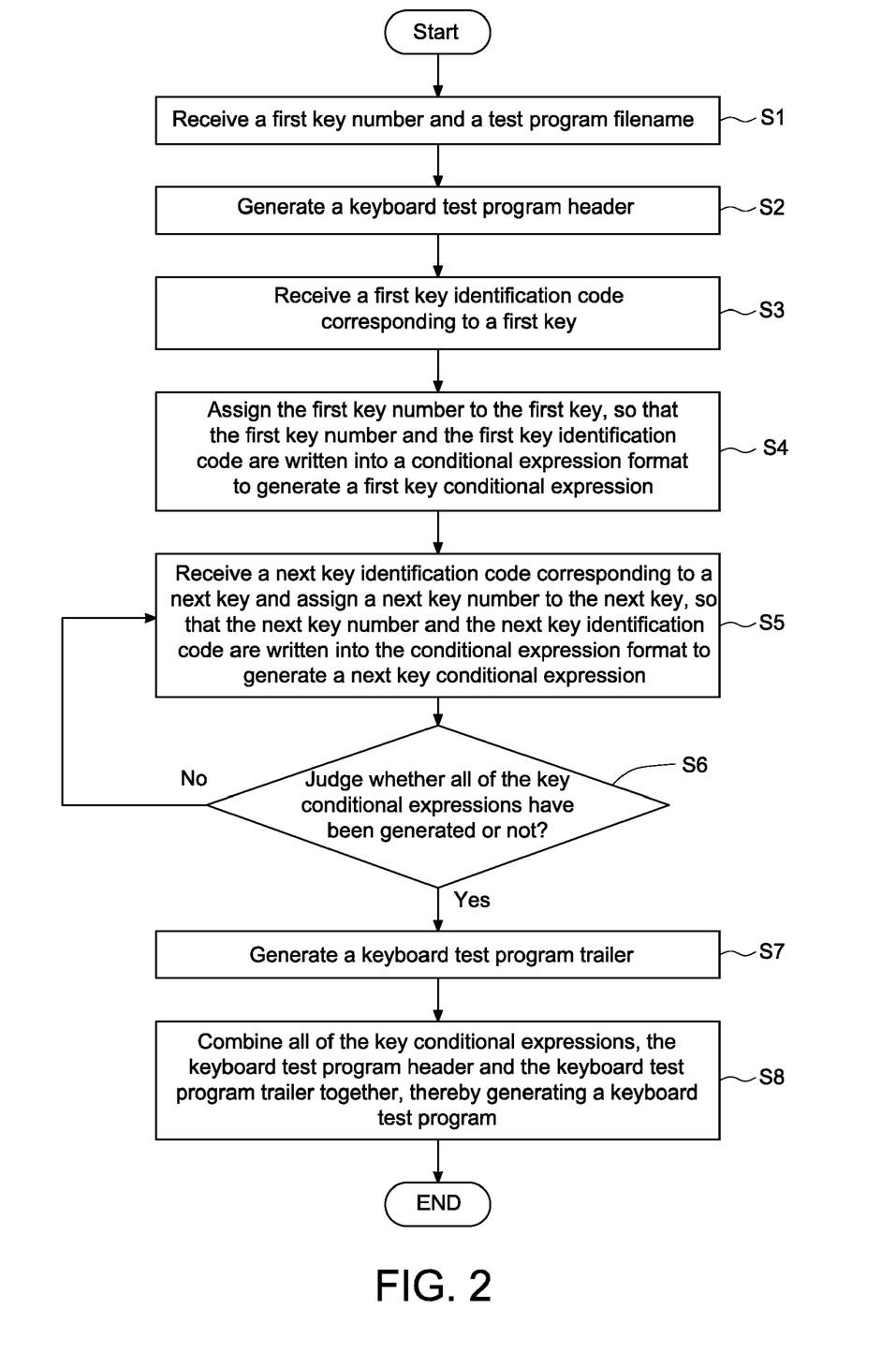
FIG. 2 is a block flowchart illustrating a keyboard test program generating method according to a first embodiment of the present invention.

FIG. 2 is a block flowchart illustrating a keyboard test program generating method according to a first embodiment of the present invention. In this embodiment, the keyboard test program generating method includes the following steps. First of all, a first key number and a test program filename are received (Step S1). Then, a keyboard test program header is generated (Step S2). Then, a first key identification code corresponding to a first key is received (Step S3). Then, the first key number is assigned to the first key, so that the first key number and the first key identification code are written into a conditional expression format to generate a first key conditional expression (Step S4). Then, a next key identification code corresponding to a next key is received, and a next key number is assigned to the next key, so that the next key number and the next key identification code are written into the conditional expression format to generate a next key conditional expression (Step S5). In this embodiment, the first key identification code and the next (second) key identification code are scan codes. The, the step S6 judges whether all key conditional expressions have been generated or not. Once all key conditional expressions have been generated (Step S6), a keyboard test program trailer is generated (Step S7). Afterwards, all of the key conditional expressions, the keyboard test program header and the keyboard test program trailer are combined together, thereby generating the keyboard test program (Step S8). Whereas, once all key conditional expressions have not been completely generated, the step S5 is repeatedly done. It is noted that the first key number and the next key number are consecutive positive integers. That is, the next key number is a positive integer following the first key number. For example, assuming that a first key, a second key and a third key are intended to be consecutively tested, if a first key number "17" is assigned to the first key, a second key number "18" will be assigned to the second key and a third key number "19" will be assigned to the third key.

Figure 3:
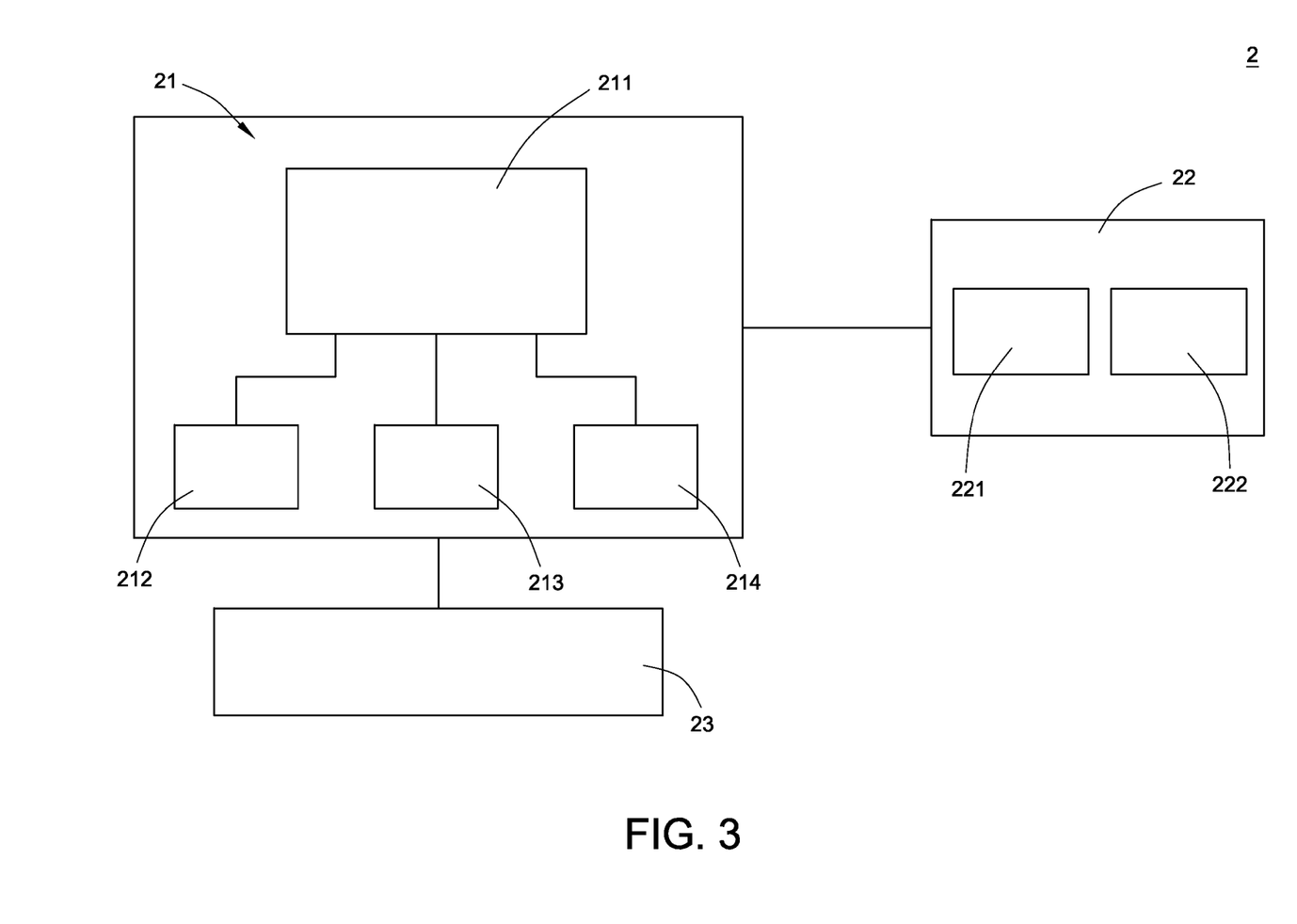
FIG. 3 is a schematic functional block diagram illustrating a keyboard test program generating system according to a first embodiment of the present invention.

Hereinafter, a system for implementing the keyboard test program generating method of the present invention will be illustrated with reference to FIG. 3. FIG. 3 is a schematic functional block diagram illustrating a keyboard test program generating system according to a first embodiment of the present invention. As shown in FIG. 3, the keyboard test program system 2 comprises a computer host 21, a computer monitor 22 and a keyboard device 23. A conditional expression generating program 211 is installed in the computer host 21. When the conditional expression generating program 211 is executed, plural key conditional expressions are generated. In addition, a conditional expression format 212, a keyboard test program header 213 and a keyboard test program trailer 214 are stored in the computer host 21. In this embodiment, the conditional expression format 212, the keyboard test program header 213 and the keyboard test program trailer 214 are previously written and stored in the computer host 21. The computer monitor 22 is used for displaying a test program generating interface 221 and a keyboard test interface 222. The keyboard device 23 comprises plural keys, including a first key, a second key, . . . , and so on. The keyboard device 23 is illustrated by referring to the conventional keyboard device as shown in FIG. 1.

Figure 4:
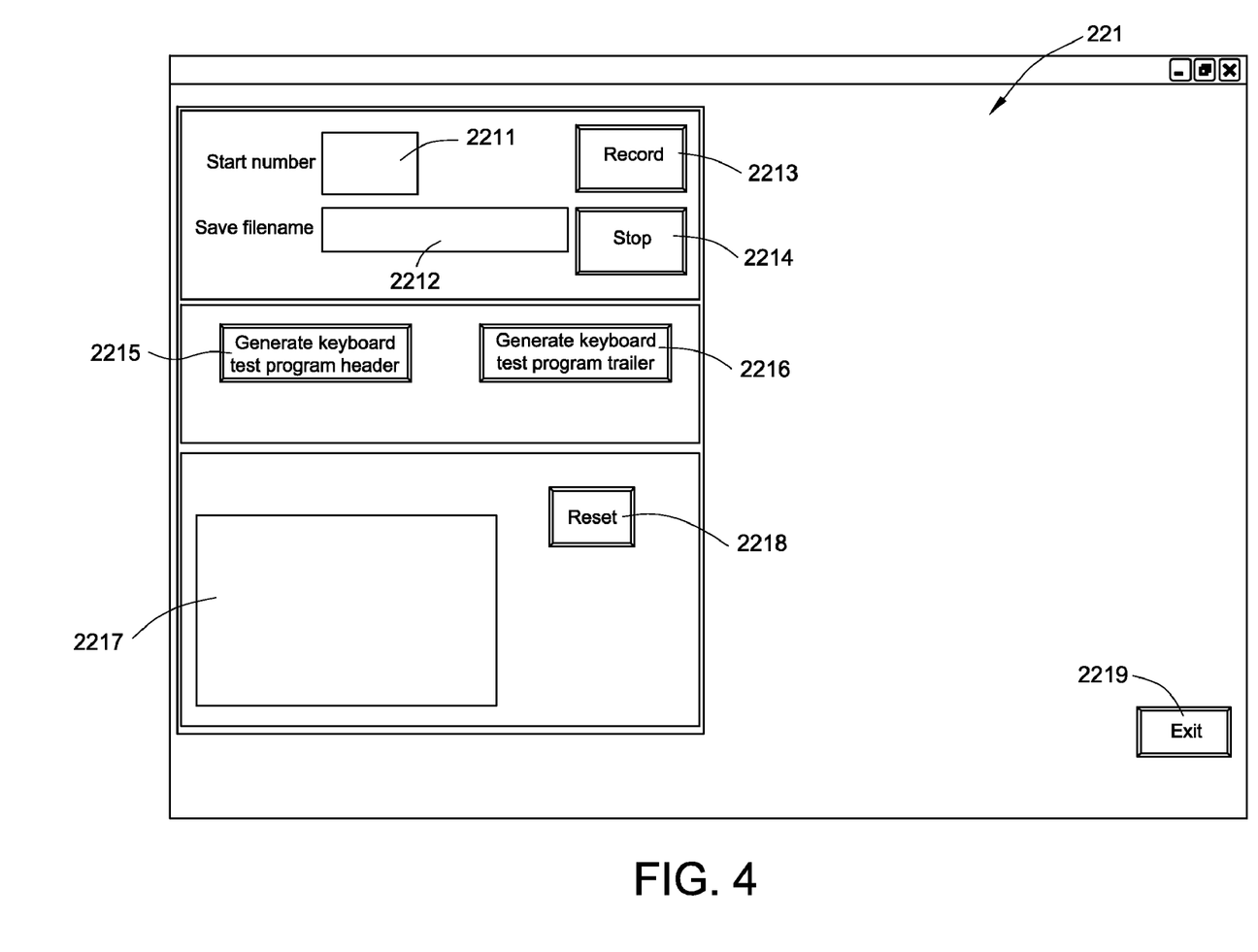
FIG. 4 is a graphic-based window illustrating the test program generating interface of the keyboard test program generating system according to the first embodiment of the present invention.

Before the process of testing the keyboard device 23, a keyboard test program specially for testing the keyboard device 23 should be previously generated. After the conditional expression generating program 211 is opened, the test program generating interface 221 is displayed on the computer monitor 22. The contents of the test program generating interface 221 are shown in FIG. 4. The test program generating interface 221 comprises a starting test number field 2211, a save filename field 2212, a record selective item 2213, a stop selective item 2214, a keyboard test program header selective item 2215, a keyboard test program trailer selective item 2216, a display field 2217, a reset selective item 2218 and an exit selective item 2219. The test number to be started may be inputted into the starting test number field 2211. The filenames of the plural key conditional expressions to be saved may be inputted into the save filename field 2212. The plural key conditional expressions, the keyboard test program header 213 and the keyboard test program trailer 214 may be saved as a Notepad file (having an extension name of .txt) or a Microsoft Word document file (having an extension name of .doc). In this embodiment, the plural key conditional expressions, the keyboard test program header 213 and the keyboard test program trailer 214 are saved as a Notepad file. By clicking the record selective item 2213, the plural key identification codes are successively recorded. By clicking the stop selective item 2214, the process of recording the plural key identification codes is stopped. By clicking the keyboard test program header selective item 2215, the stored keyboard test program header 213 is opened. By clicking the keyboard test program trailer selective item 2216, the stored keyboard test program trailer 214 is opened. The recorded plural key data may be shown on the display field 2217. By clicking the reset selective item 2218, the display field 2217 is cleared. By clicking the exit selective item 2219, the test program generating interface 221 is closed. In this embodiment, the selective items included in the test program generating interface 221 are indicated by icons, which are clicked to execute corresponding instructions.

Figure 5:
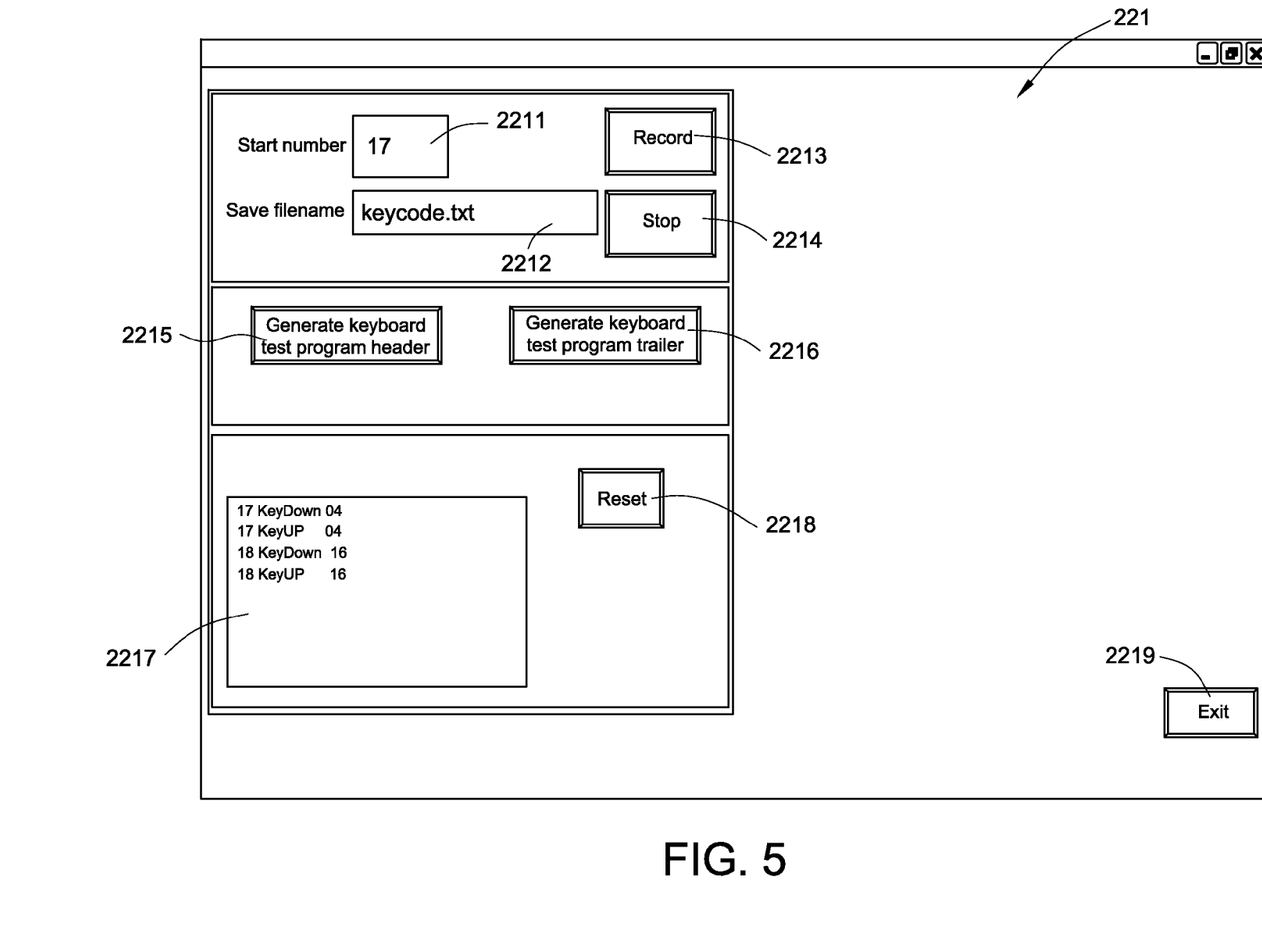
FIG. 5 is a graphic-based window illustrating the process of generating the keyboard test program by operating the keyboard test program generating system according to the first embodiment of the present invention.

After the process of testing the keyboard device 23 is started, the conditional expression generating program 211 is opened, and the program interface 221 is displayed on the computer monitor 22. Firstly, the user inputs a first key number and a test program filename, so that the first key number and the test program filename are received by the computer host 21 (Step S1). For example, as shown in FIG. 5, the first key number is "17" and the test program filename is "keycode.txt". Next, by clicking the keyboard test program header selective item 2215 of the test program generating interface 221, a keyboard test program header 213 is generated (Step S2).

After the keyboard test program header 213 is generated, the user may press a first key of the keyboard device 23. In response to the pressing action, the keyboard device 23 generates a first key identification code corresponding to the first key, and the first key identification code is received by the computer host 21 (Step S3). For example, the first key is "A". During the time period after the first key number is received by the computer host 21 and before the next key number is received, if a key identification code is received by the computer host 21, the conditional expression generating program 211 will assign the first key number to the received key identification code. In other words, the first key number is assigned to the key corresponding to the key identification code. In this embodiment, the conditional expression generating program 211 assigns the first key number (i.e. "17") to the first key (e.g. the key "A"). Then, the first key number and the first key identification code are written into the conditional expression format 212, which is stored in the computer host 21, thereby generating a first key conditional expression (Step S4). Meanwhile, the keyboard test program (having the test program filename "keycode.txt") includes the keyboard test program header 213 and the first key conditional expression.

Next, a second key of the keyboard device 23 is pressed by the user. In response to the pressing action, the keyboard device 23 generates a second key identification code corresponding to the second key, and the second key identification code is received by the computer host 21. Similarly, the conditional expression generating program 211 assigns a second key number following the first key number to the second key. For example, the second key number is a positive integer "18" following the first key number "17". As such, the second key number ("18") and the second key identification code are written into the conditional expression format 212, thereby generating a second key conditional expression (Step S5). For example, the second key is "S". Since the keys of the keyboard device 23 have not been completely recorded, the next key conditional expression is continuously generated (from Step S6 to Step S5). Meanwhile, the recorded keys include the first key and the second key, and the key data thereof are displayed on the display field 2217 of the test program generating interface 221 (see FIG. 5). In the display field 2217, the key data associated with the first keys are shown in the first row and the second row. For example, the first row shows "17 KeyDown 04", wherein "17" denotes the key number, "KeyDown" denotes that the key is pressed down, and "04" denotes the scan code of the key. In addition, the second row shows "17 KeyUp 04", wherein "KeyUp" denotes that the key bounces up to the original position. The "KeyDown" or "KeyUp" is an index for judging whether the key is continuously pressed. That is, if the first key is continuously pressed, several rows of "17 KeyDown 04" will be successively shown in the display field 2217 to indicate that the first key has not bounced up to the original position. The key data associated with the first keys are shown in the third row and the fourth row. Except for the key number and the key identification code, the key data of the third row and the fourth row are substantially identical to those of the first row and the second row.

After all keys of the keyboard device 23 are successively pressed by the user and recorded by the conditional expression generating program 211 to generate the key conditional expressions of respective keys, by clicking the keyboard test program trailer selective item 2216 of the test program generating interface 221, a keyboard test program trailer 214 is generated (from Step S6 to Step S7). Afterwards, all of the key conditional expressions, the keyboard test program header 213 and the keyboard test program trailer 214 are combined together, thereby generating the keyboard test program (Step S8). Meanwhile, the process of generating the keyboard test program is finished.

Figure 6A:
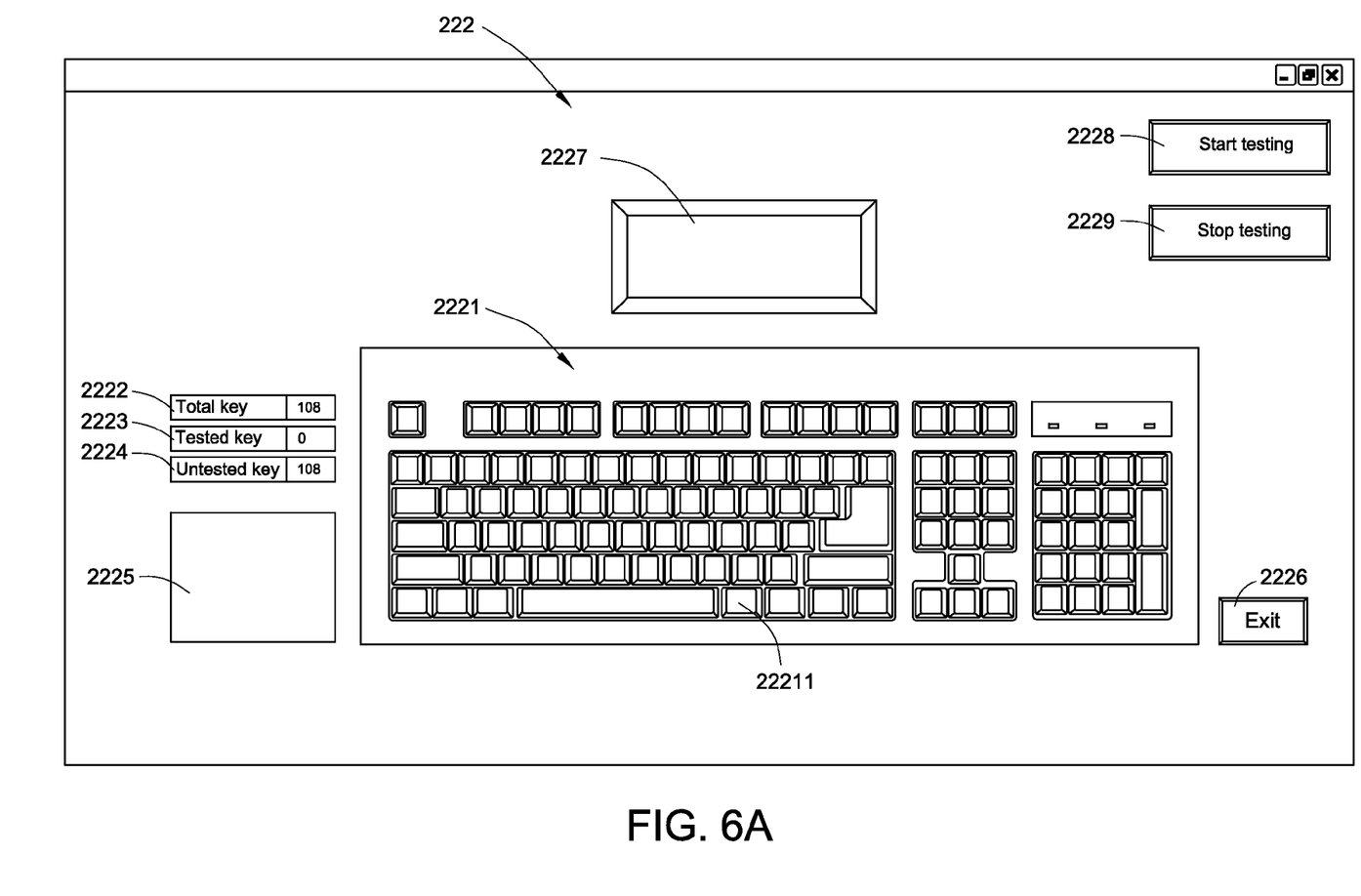
FIGS. 6A, 6B and 6C are graphic-based windows schematically illustrating the keyboard test interface of the keyboard test program generating system according to the first embodiment of the present invention.
Figure 6B:
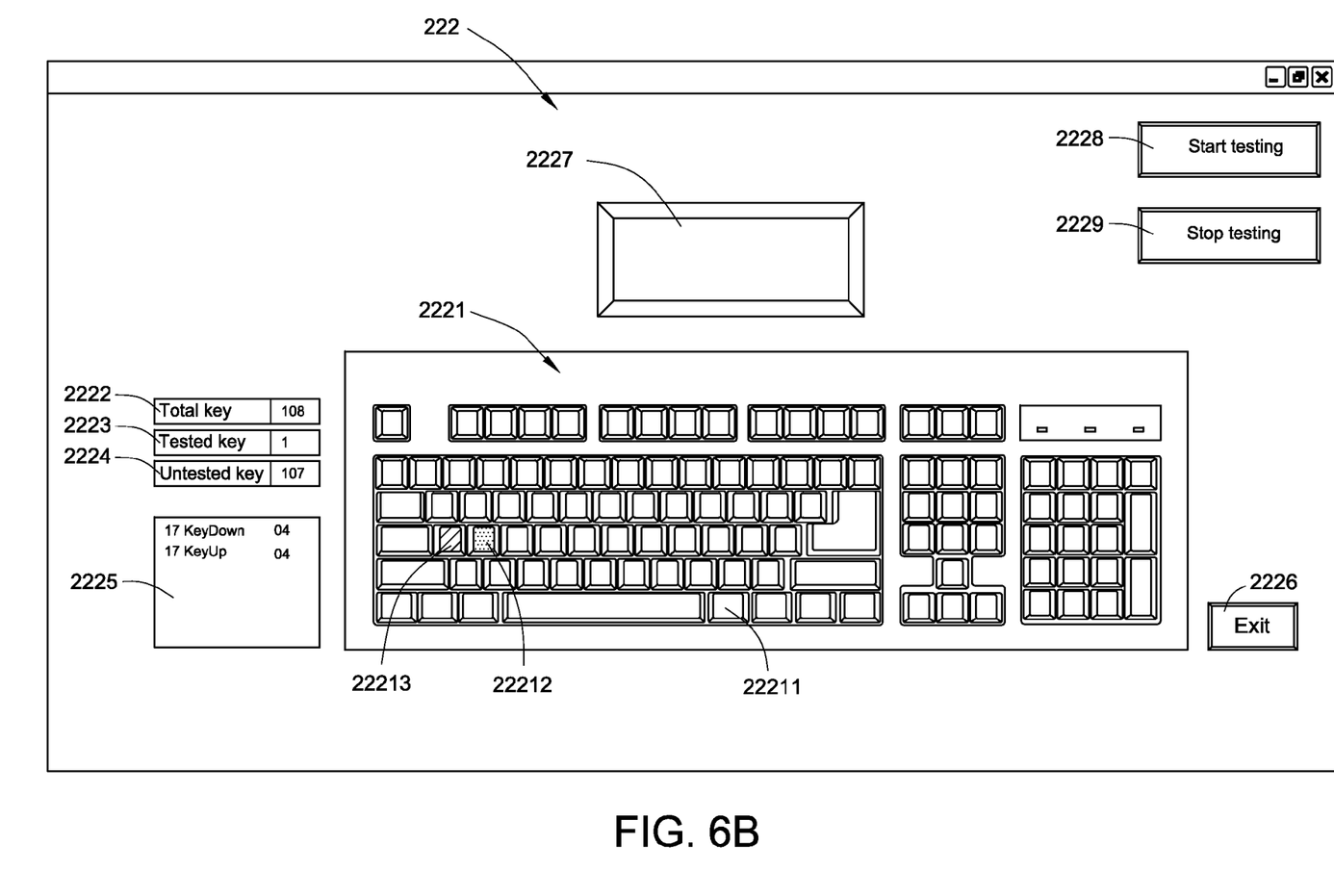
Figure 6C:
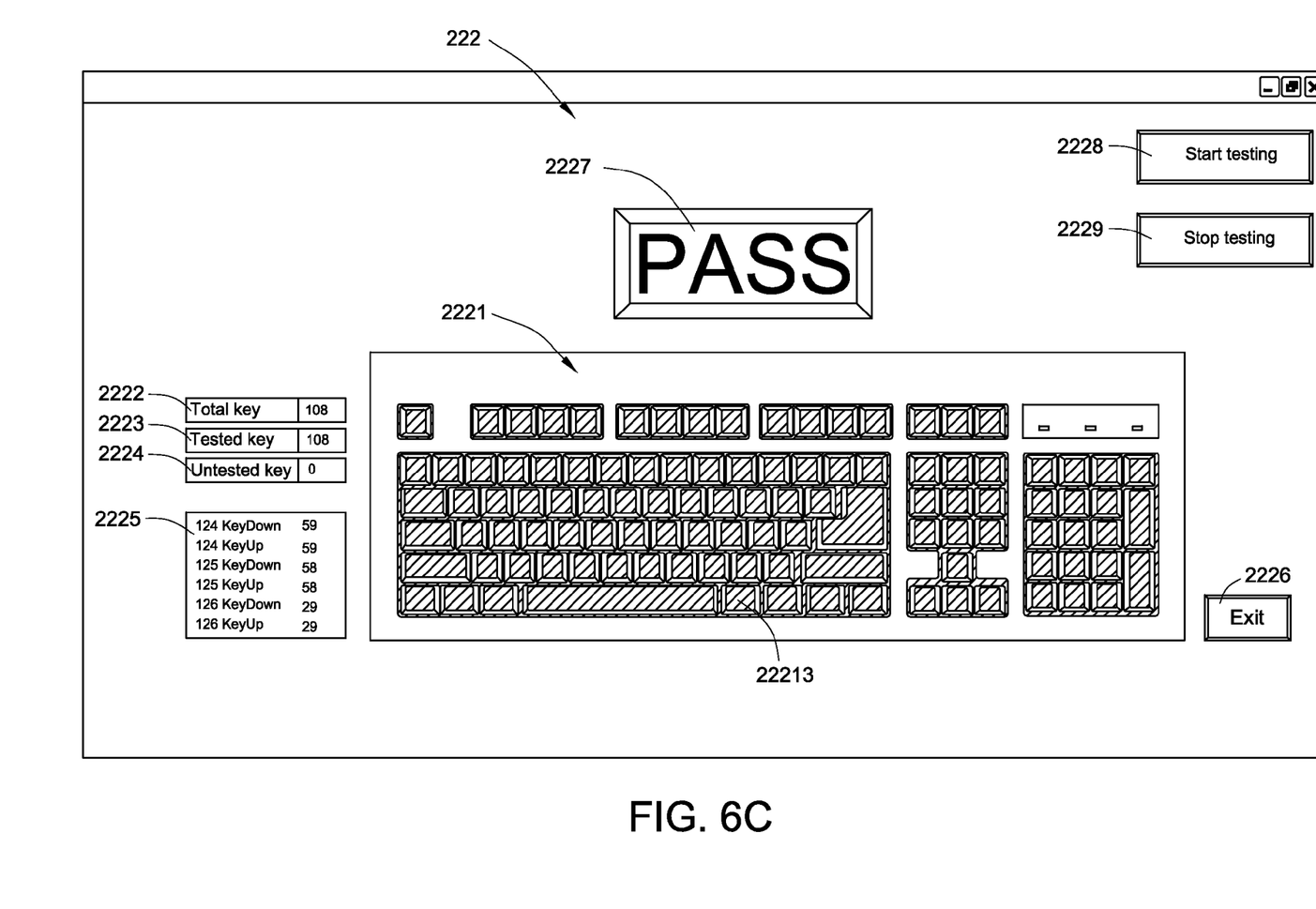

After the keyboard test program is generated, the keyboard test program is executed in order to test the keyboard device 23. When the keyboard test program is opened, the keyboard test interface 222 is shown on the computer monitor 22. FIGS. 6A, 6B and 6C are graphic-based windows schematically illustrating the keyboard test interface of the keyboard test program generating system according to the first embodiment of the present invention. The keyboard test interface 222 comprises plural key images 2221, a total test key number field 2222, a tested key number field 2223, an untested key number field 2224, a test display field 2225, a test exit selective item 2226, a test status field 2227, a test starting selective item 2228 and a test stop selective item 2229. The plural key images 2221 correspond to the plural keys of the keyboard device 23, respectively. The plural key images 2221 are used to prompt the user which keys have been tested and which key may be pressed to continuously perform the testing process. The total number of the keys required to be tested is shown in the total test key number field 2222. The number of the keys that have been tested is shown in the tested key number field 2223. The number of the keys that have not been tested is shown in the untested key number field 2224. The key data of the tested key are shown in the test display field 2225. In this embodiment, the key data shown in the test display field 2225 are similar to those shown in the display field 2217 of the test program generating interface 221. By clicking the test exit selective item 2226, the keyboard test interface 222 is closed. The test statuses of the keys are shown in the test status field 2227. By clicking the test starting selective item 2228, the process of testing the keyboard device is started. By clicking the test stop selective item 2229, the process of testing the keyboard device is stopped.

After the keyboard test interface 222 is displayed on the computer monitor 22, the user may click the test starting selective item 2228 to initiate the keyboard test process. The keyboard test interface 222 shown in FIG. 6A indicates that the test starting selective item 2228 has been clicked but none of the keys have been tested. In this situation, the key number shown in the tested key number field 2223 is 0, the key number shown in the total test key number field 2222 is 108, and the key number shown in the untested key number field 2224 is 108. The test display field 2225 and the test status field 2227 are blank. The plural key images 2221 may be classified into plural untested key images 22211 and a to-be-tested key image 22212. The untested key images 22211 are marked with a first color in order to prompt the user that the keys corresponding to these untested key images 22211 have not been tested. Whereas, the to-be-tested key image 22212 is marked with a second color in order to prompt the user that the key corresponding to the to-be-tested key image 22212 needs to be pressed and tested. For example, the to-be-tested key image 22212 of the key images 2221 corresponds to the first key (i.e. the key "A"), and the untested key images 22211 of the key images 2221 correspond to all keys other than the first key.

Next, when the first key is pressed to test the first key, the key image of the key images 2221 corresponding to the first key is switched to a tested key image 22213 to indicate that the first key has been tested. The tested key image 22213 is marked with a third color. According to the keyboard test program, the next to-be-tested key is the second key (i.e. the key "S"). Please refer to FIG. 6B. As a consequence, the key image of the key images 2221 corresponding to the second key is switched to a to-be-tested key image 22212, which is marked with the second color. In addition, the keys other than the first key and the second key have the untested key images 22211.

Please refer to FIG. 6B again. After the first key is tested, the key numbers shown in the tested key number field 2223 and the untested key number field 2224 are both changed. The key data shown in the test display field 2225 are similar to those shown in the display field 2217 of the test program generating interface 221, and are not redundantly described herein. During the process of testing the first key, if the first key is normally operated and able to pass the test, the test status field 2227 is maintained blank. Whereas, if the first key is abnormally operated and fails to pass the test, a word "FAIL" is shown in the test status field 2227.

The above processes are performed to test the other untested keys of the keyboard device 23. If all of the keys are normally operated and able to pass the test, a word "PASS" is shown in the test status field 2227 (see FIG. 6C). Meanwhile, the keyboard test process is finished.

It is noted that the sequences of testing the plural keys on the keyboard device 23 are determined according to the plural key numbers arranged in ascending. That is, the key corresponding to the key number having the smallest positive integer needs to be tested at first. In the embodiment, since the key number having the smallest positive integer is the first key number (i.e. "17"), the first key is tested at first.

Figure 7:
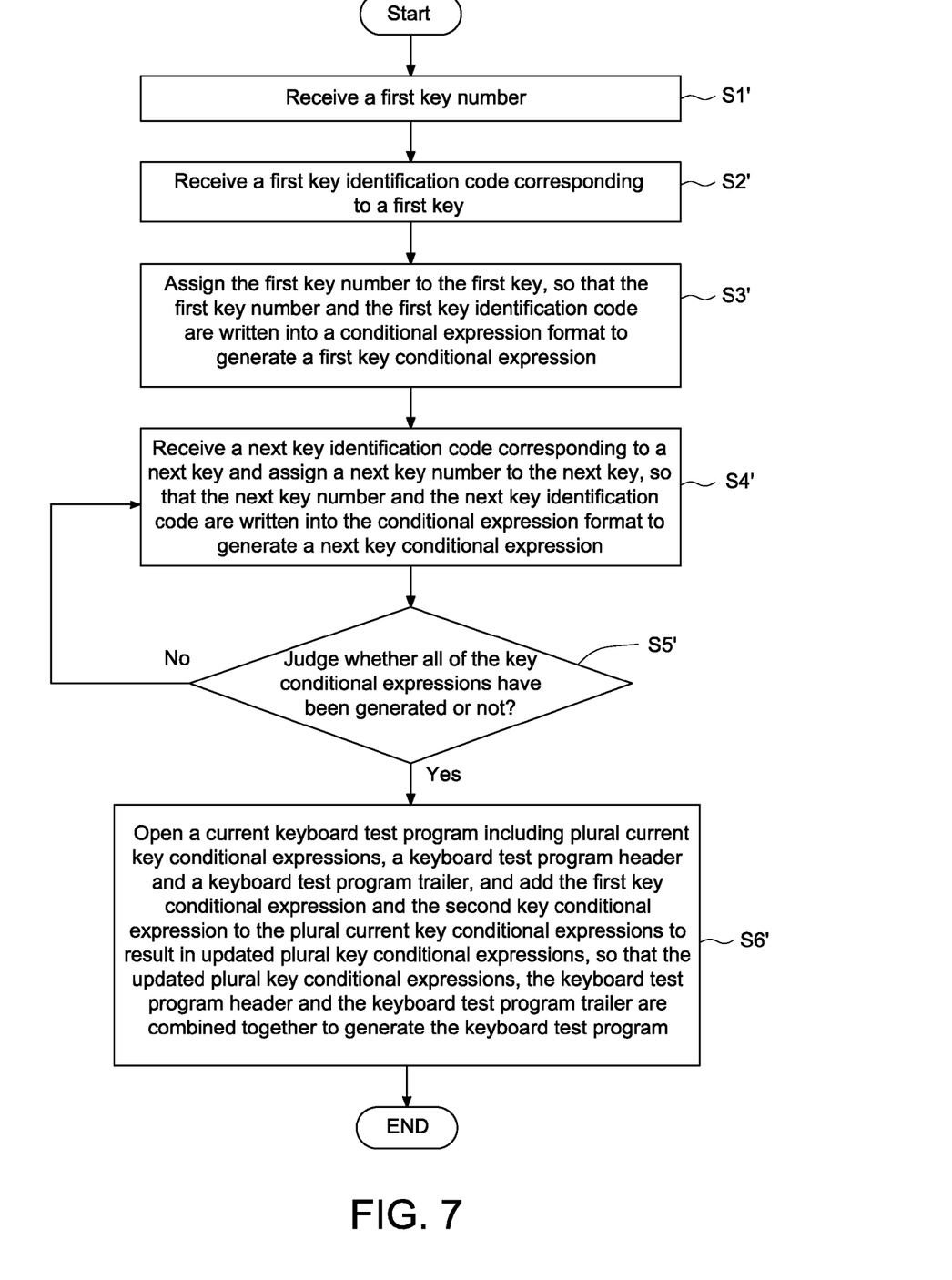
FIG. 7 is a block flowchart illustrating a keyboard test program generating method according to a second embodiment of the present invention.

The present invention further provides a second embodiment. FIG. 7 is a block flowchart illustrating a keyboard test program generating method according to a second embodiment of the present invention. In this embodiment, the keyboard test program generating method includes the following steps. First of all, a first key number is received (Step S1'). Then, a first key identification code corresponding to a first key is received (Step S2'). Then, the first key number is assigned to the first key, so that the first key number and the first key identification code are written into a conditional expression format to generate a first key conditional expression (Step S3'). Then, a next key identification code corresponding to a next key is received, and a next key number is assigned to the next key, so that the next key number and the next key identification code are written into the conditional expression format to generate a next key conditional expression (Step S4'). Once all key conditional expressions have been generated (Step S5'), the step S6' is done. Whereas, once all key conditional expressions have not been completely generated, the step S4' is repeatedly done. In Step S6', a current keyboard test program including plural current key conditional expressions, a keyboard test program header and a keyboard test program trailer is opened, and the first key conditional expression and the second key conditional expression are added to the plural current key conditional expressions to result in updated plural key conditional expressions, so that the updated plural key conditional expressions, the keyboard test program header and the keyboard test program trailer are combined together to generate the keyboard test program.

In this embodiment, the new keyboard test program is obtained by modifying the current keyboard test program. The new keyboard test program is executed to test the conventional keyboard device (e.g. the keyboard device as shown in FIG. 1). In a case that the new keyboard device additionally has the first key and the second key in comparison with the conventional keyboard device, the first key conditional expression and the second key conditional expression are added to the plural current key conditional expressions without the need of rewriting the keyboard test program for the new keyboard device.

In comparison with the first embodiment, the keyboard test program generating method according to the second embodiment of the present invention do not need to additionally produce the keyboard test program header and the keyboard test program trailer. That is, the keyboard test program header and the keyboard test program trailer originally included in the current keyboard test program are directly adopted. Moreover, the operating principles and configurations of the second embodiment are similar to those of the first embodiment, and are not redundantly described herein.

For example, assuming that the key numbers of the plural current key conditional expressions are ranged from 13 to 120, the first key number inputted in the step S1' may be set as "11". In the step S3', the conditional expression generating program will assign the second key number following the first key number (i.e. "12") to the second key, and add the first key conditional expression (corresponding to the first key) and the second key conditional expression (corresponding to the second key) to the plural current key conditional expressions so as to result in updated plural key conditional expressions. In this situation, the first key is tested at first. It is of course that the first key number may be set as "121" and the second key number may be set as "122".

In accordance with the second embodiment, the keyboard test program generating method of the present invention does not need to successively write the key conditional expressions of all keys. Whereas, by simply pressing all keys of the keyboard device, plural key conditional expressions corresponding to the keys are generated. Moreover, by modifying the plural current key conditional expressions or adding the additional key conditional expressions to the plural current key conditional expressions, a desired new keyboard test program will be generated, so that the time period of generating the keyboard test program is shortened.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A non-transitory computer readable medium containing a keyboard test program stored therein for generating method for generating a keyboard test program to test plural keys of a keyboard device, said plural keys comprising a first key and a second key, said keyboard test program executed by a computer device to perform a method comprising the steps of:
   receiving a first key number;
   receiving a first key identification code corresponding to said first key;
   assigning said first key number to said first key, so that said first key number and said first key identification code are written into a conditional expression format to generate a first key conditional expression;
   receiving a second key identification code corresponding to said second key;
   assigning a second key number following said first key number to said second key, so that said second key number and said second key identification code are written into said conditional expression format to generate a second key conditional expression; and
   combining said first key conditional expression, said second key conditional expression, a keyboard test program header and a keyboard test program trailer together, thereby generating said keyboard test program.

2. The non-transitory computer readable medium according to claim 1 wherein said keyboard test program header and said keyboard test program trailer are previously written and stored, wherein said keyboard test program header and said keyboard test program trailer are generated by clicking a keyboard test program header selective item and a keyboard test program trailer selective item of a test program generating interface, respectively.

3. The non-transitory computer readable medium according to claim 1 further comprising steps of:
   opening a current keyboard test program, wherein said current keyboard test program includes plural current key conditional expressions, said keyboard test program header and said keyboard test program trailer; and
   adding said first key conditional expression and said second key conditional expression to said plural current key conditional expressions to result in updated plural key conditional expressions, so that said updated plural key conditional expressions, said keyboard test program header and said keyboard test program trailer are combined together to generate said keyboard test program.

4. The non-transitory computer readable medium according to claim 1 wherein the sequences of testing said plural keys of said keyboard device are determined according to said first key number and said second key number in ascending order.

5. The non-transitory computer readable medium according to claim 1 wherein said first key identification code is generated when said first key is pressed, and said second key identification code is generated when said second key is pressed.

6. The non-transitory computer readable medium according to claim 1 wherein said first key identification code and said second key identification code are scan codes.

7. The non-transitory computer readable medium according to claim 1 wherein said first key conditional expression, said second key conditional expression, said keyboard test program header and said keyboard test program trailer are saved as a Notepad file or a Microsoft Word document file.

8. The non-transitory computer readable medium according to claim 7 wherein a document filename of said Notepad file or said Microsoft Word document file is inputted via a save filename field of a test program generating interface.

9. The non-transitory computer readable medium according to claim 1 wherein when said keyboard test program is executed, said keyboard test program provides a keyboard test interface to prompt which keys of said plural keys have been tested and which key needs to be pressed and continuously tested.

10. The non-transitory computer readable medium according to claim 9 wherein said keyboard test interface comprises plural key images, which are classified into an untested key image, a to-be-tested key image and a tested key image, wherein said untested key image is marked with a first color, said to-be-tested key image is marked with a second color, and said tested key image is marked with a third color.

* * * * *